(12) United States Patent
Ketzer et al.

(10) Patent No.: US 10,589,315 B2
(45) Date of Patent: Mar. 17, 2020

(54) COATED MAT OF INORGANIC FIBERS, AND FUNCTIONAL DECORATIVE LAYERS, MANUFACTURED THEREFROM, IN FLOOR, CEILING AND WALL COVERINGS

(71) Applicant: JOHNS MANVILLE, Denver, CO (US)

(72) Inventors: Michael Ketzer, Collenberg (DE); Klaus Friedrich Gleich, Nuremberg (DE); Simone Schneider, Lohr (DE)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/012,845

(22) Filed: Jun. 20, 2018

(65) Prior Publication Data

US 2018/0297057 A1    Oct. 18, 2018

Related U.S. Application Data

(62) Division of application No. 14/551,855, filed on Nov. 24, 2014, now Pat. No. 10,005,102.

(51) Int. Cl.
| | |
|---|---|
| *B05D 3/02* | (2006.01) |
| *B05D 7/00* | (2006.01) |
| *D04H 1/4218* | (2012.01) |
| *E04C 2/16* | (2006.01) |
| *D06N 3/00* | (2006.01) |
| *C03C 25/10* | (2018.01) |
| *E04F 13/00* | (2006.01) |
| *B44C 1/24* | (2006.01) |
| *B44C 5/04* | (2006.01) |

(52) U.S. Cl.
CPC .............. *B05D 3/0254* (2013.01); *B05D 7/50* (2013.01); *B05D 7/584* (2013.01); *C03C 25/10* (2013.01); *D04H 1/4218* (2013.01); *D06N 3/0022* (2013.01); *E04C 2/16* (2013.01); *B05D 2252/02* (2013.01); *B44C 1/24* (2013.01); *B44C 5/04* (2013.01); *C03C 2217/72* (2013.01); *D06N 2209/121* (2013.01); *D06N 2209/1657* (2013.01); *E04F 13/002* (2013.01); *Y10T 428/2481* (2015.01); *Y10T 428/24372* (2015.01); *Y10T 428/24893* (2015.01); *Y10T 428/25* (2015.01)

(58) Field of Classification Search
CPC ...... Y10T 428/2481; Y10T 428/24372; B05D 7/584; D06N 2209/121; D06N 2209/1657
USPC .......................................................... 428/206
See application file for complete search history.

(56) References Cited

U.S. PATENT DOCUMENTS

| | | | | |
|---|---|---|---|---|
| 5,837,620 | A * | 11/1998 | Kajander ............... | B32B 21/10 442/63 |
| 2002/0168503 | A1* | 11/2002 | Dong ..................... | B32B 21/08 428/195.1 |
| 2010/0167005 | A1* | 7/2010 | Ketzer ................. | B29C 44/1228 428/116 |
| 2013/0330513 | A1* | 12/2013 | Ketzer ................... | D06N 3/183 428/143 |
| 2015/0158765 | A1 | 6/2015 | Ketzer et al. | |

FOREIGN PATENT DOCUMENTS

| | | |
|---|---|---|
| DE | 10 2009 023737 A1 | 12/2010 |
| DE | 10 2013 020 405 A1 | 7/2015 |
| EP | 2 644 762 A1 | 10/2013 |
| EP | 2 672 001 A1 | 12/2013 |
| EP | 2 690 217 A1 | 1/2014 |
| EP | 2 269 814 B1 | 2/2014 |
| WO | 2008 101678 A2 | 8/2008 |
| WO | 2008 101679 A2 | 8/2008 |

* cited by examiner

*Primary Examiner* — Betelhem Shewareged

(74) *Attorney, Agent, or Firm* — Robert D. Touslee

(57) ABSTRACT

A method for manufacturing a mat of inorganic fibres including the manufacture or supply of a mat of inorganic fibres having two major surfaces, which is strengthened with a chemical binder, or by means of a hydrodynamic method, coating of a first major surface of the mat by means of the application of an aqueous solid dispersion on one of the two sides of the mat, drying the coated mat, printing the coated mat by means of rotary printing, digital printing, screen printing, or offset printing on the first major surface of the coating, optional application of a protective layer onto the first major surface, application of a binder, at least partial drying and at least partial crosslinking of the mat to which binder has been applied, and rolling up of the obtained material web, or cutting to size as sheets.

20 Claims, No Drawings

COATED MAT OF INORGANIC FIBERS, AND FUNCTIONAL DECORATIVE LAYERS, MANUFACTURED THEREFROM, IN FLOOR, CEILING AND WALL COVERINGS

CROSS REFERENCE TO RELATED APPLICATION

This application is a division of pending U.S. application Ser. No. 14/551,855 filed Nov. 24, 2014, the entire disclosure of which is hereby incorporated by reference herein.

BACKGROUND OF THE INVENTION

The invention relates to mats of inorganic fibres, in particular glass mats, with a special coating and decorative coatings, manufactured therefrom, in floor, ceiling and wall coverings, and also a method for their manufacture.

Decorative coatings in the form of two-dimensional rolls or sheets of material as mats based on thermoplastic fibres or cellulose fibres with decorative printing and, on occasion, with additional plastic finishes, are of sufficiently known art. Mat-form materials with mineral fillers as plasterboard reinforcements, or so-called decorator mats with mineral coatings, which after installation on the wall require a further coating, are also of known art.

Decorative coatings inside buildings, in particular in public and/or commercial buildings, must become ever safer with regard to the risks that can be brought about by fires. The heightened fire protection requirements are of known art from the legal regulations of the experts, which are steadily intensifying. These heightened requirements increasingly involve also individual components of internal structures, such as, for example, floor coverings, wall coverings and/or ceiling coatings. Such decorative elements, taken on their own, can sometimes be classified as unsafe with regard to the fire protection requirements, or else can be manufactured only very expensively. However, by the use of glass mats, which have decorative layers, the said fire protection requirements can be fulfilled. Printed mats of inorganic fibres, in particular glass mats, have calorimetric values of less than 5,000 J/kg, compared with paper with values of more than 10,000 J/kg, and thus automatically have an appropriate level of fire resistance. By this means it is possible to manufacture wall, floor or ceiling coverings in a very simple and safe manner.

The manufacture of printed mats of inorganic fibres, in particular glass mats, is not trivial. The high level of permeability to air of mats of inorganic fibres, in particular glass mats, leads to the fact that conventional coatings, e.g. those based on calcium carbonate and/or kaolin, fill the spaces between the fibres. This leads to end products that have an undesirably high mass per unit surface area of, for example, more than 260 g/m$^2$, where the basic mat has a figure of only 55 g/m$^2$. Comparable papers have in contrast a mass of approx. 70-80 g/m$^2$ as end products.

Furthermore coatings or coating materials of known art lead to a surface quality that is insufficient to fulfil the high requirements of direct printing (e.g. rotary printing) or similar printing methods. Faults in the surface quality, such as for example unevennesses or micro-openings, lead to so-called missing dots, i.e. very small points on the surface that after printing have a lack of ink. The reason for this is that printing rollers are unable to wet such low points in the surface with ink.

The object was therefore to provide mats with a coating, which mats possess a very low total mass and a low permeability to air, and have an excellent surface quality.

DETAILED DESCRIPTION OF THE INVENTION

The subject of the present invention is a method for the manufacture of mats of inorganic fibres that have at least one printed coating on one of the two surfaces, comprising the steps:
  (i) manufacture or supply of a mat of inorganic fibres, which is strengthened with a chemical binder, or by means of a hydrodynamic method,
  (ii) coating of one side of the mat by means of the application of an aqueous solid dispersion on one of the two sides of the mat,
  (iii) drying of the coated mat obtained in accordance with step (ii),
  (iv) printing of the coated mat obtained in accordance with step (iii) by means of direct printing methods on the surface of the coating,
  (v) optional application of a protective layer onto the printed surface,
  (vi) application of a binder, and removal of excess binder as necessary,
  (vii) at least partial drying and at least partial crosslinking of the mat to which binder has been applied,
  (viii) rolling up of the material web obtained, or cutting to size as sheets, characterised in that
  (a) the mat manufactured in step (iii) has a permeability to air (in accordance with Gurley) in the range from 50 to 150 sec/300 ml, preferably from 5 to 50 sec/100 ml, and smoothness values (in accordance with Bekk) of 100-500 sec, and preferably between 150-400 sec,
  (b) the aqueous dispersion applied in step (ii) comprises particles with a grain size in the range from 0.1 μm to 5 μm, and preferably in the range from 0.5 μm to 2 μm,
  (c) the aqueous dispersion applied in step (ii) is applied by means of an application process not requiring the application of force,
  (d) the coating applied in step (iii) after drying corresponds to a mass per unit surface area of between 50 and 200 g/m$^2$, and preferably between 80 and 150 g/m$^2$,
  (e) the printing executed in step (iv) takes place directly onto the surface coating obtained in accordance with step (iii),
  (f) the binder in step (vi) is a binder system capable of B-stage curing, and the binder system capable of B-stage curing is transferred in step (vi) into a B-stage state,
  (g) the application of the binder system capable of B-stage curing in step (vi) takes place onto the non-coated side of the mat, or by impregnation of the mat, and
  (h) the quantity of binder system capable of B-stage curing applied in step (vi) is between 40 and 80% by mass, and preferably between 50 and 70% by mass, wherein these numbers relate to the total mass of the mat after it has been fully dried.

Further subjects of the present invention are the products and intermediate products manufactured by means of the inventive method. The inventive method can also be interrupted, i.e. steps (i) to (iii) and steps (iv) to (vii) can be executed separately from one another, both in time and space. The coated mat obtained in accordance with step (iii) represents a valuable intermediate product.

A further subject of the present invention is a mat of inorganic fibres, which on one of the two surfaces has a printable coating, wherein:
  (i) the coating comprises particles, whose grain size lies in the range from 0.1 µm to 5 µm, and preferably between 0.5 µm and 2 µm, and the mass per unit surface area of the coating corresponds to a mass per unit surface area of between 50 and 200 g/m², and preferably between 80 and 150 g/m²,
  (ii) the coating has been applied onto the mat by means of an application process not requiring the application of force,
  (iii) the printing can take place directly onto the surface coating, characterised in that the coated mat has a permeability to air (in accordance with Gurley) in the range from 50 to 150 sec/300 ml, preferably from 5 to 50 sec/100 ml, and smoothness values (in accordance with Bekk) of 100-500 sec, and preferably between 150-400 sec.

A further subject of the present invention is a mat of inorganic fibres, which on one of the two surfaces has a printed coating, wherein:
  (i) the coating comprises particles, whose grain size lies in the range from 0.1 µm to 5 µm, and preferably between 0.5 µm and 2 µm, and the mass per unit surface area of the coating corresponds to a mass per unit surface area of between 50 and 200 g/m², and preferably between 80 and 150 g/m²,
  (ii) the coating has been applied onto the mat by means of an application process not requiring the application of force,
  (iii) the printing has taken place directly onto the surface coating,
  (iv) the coated and printed mat has a binder system capable of B-stage curing in the B-stage state,
  (v) the quantity of the binder system capable of B-stage curing is between 40 and 80 by mass, and preferably between 50 and 70% by mass, wherein these numbers relate to the total mass of the mat after it has been fully dried.

The inventively coated mats of inorganic fibres can have still further functional layers, for example antibacterial, antistatic, fire resistant and/or conductive layers.

The inventively coated mats of inorganic fibres, in particular the glass mats, have a mass per unit surface area of between 50 and 500 g/m², and preferably of between 100 and 500 g/m², wherein these numbers relate to the end product, wherein the coating amounts to at least 25 g/m², and a maximum of 300 g/m².

The inventively coated mats of inorganic fibres, in particular the glass mats, have a permeability to air (in accordance with Gurley) in the range from 50 to 150 sec/300 ml, preferably from 5 to 50 sec/100 ml, more preferred from 10 to 30 sec/100 ml.

The inventively coated mats of inorganic fibres, and in particular the glass mats, have a very smooth surface quality, which, expressed as a roughness or smoothness, have a smoothness value (Bekk) of between 100 and 500, and preferably of between 150 and 400.

Surfaces of such quality can be printed directly with printing technologies of known art, such as digital printing, rotary printing, or screen printing. In the context of the invention, "directly" signifies that the surfaces no longer need to be smoothed using abrasive methods, and there are no longer any unevennesses present that must be removed by the application of appropriate fillers.

Mats of Inorganic Fibres

The mats of inorganic fibres take the form of glass fibre mats, and/or mats of inorganic mineral and ceramic fibres.

Suitable inorganic mineral and ceramic fibres include aluminosilicate-, ceramic-, dolomite-wollastonite fibres, or fibres of vulcanites, preferably basalt-, diabase- and/or melaphyre fibres, and in particular basalt fibres. Diabase and melaphyre are together summarised as palaeo-basalts and diabase is often also denoted as greenstone.

Mats based on mineral fibres can be formed from filaments, i.e. continuous long fibres, or from staple fibres. The average length of the staple fibres in the inventively used mat of mineral fibres is between 5 and 120 mm, preferably between 5 and 90 mm, and in particular between 5 and 20 mm. In a further form of embodiment of the invention the mineral fibre mat contains a mixture of continuous fibres and staple fibres. Mineral fibre mats of staple fibres of the above-cited average length are preferred. The average fibre diameter of the mineral fibres is between 5 and 30 µm, preferably between 8 and 18 µm, and particularly preferably between 8 and 10 µm.

The mass per unit surface area of the mat of mineral fibres is between 25 and 150 g/m², and preferably between 30 and 70 g/m², wherein these numbers relate to a planar structure with binder.

Mats based on mineral fibres can be formed from filaments, i.e. continuous long fibres, or from staple fibres. The average length of the staple fibres is between 5 and 120 mm, preferably between 10 and 90 mm, and in particular between 5 and 20 mm. In a further form of embodiment of the invention the mineral fibre mat contains a mixture of continuous fibres and staple fibres. Mineral fibre mats of staple fibres of the above-cited average length are preferred. The average fibre diameter of the mineral fibres is between 6 and 30 µm, preferably between 8 and 18 µm, and particularly preferably between 8 and 10 µm.

In addition to the above-cited diameters, so-called glass microfibres can also find application. The preferred average diameter of the glass microfibres is here between 0.1 and 6 µm, and preferably between 0.8 and 3.5 µm. The proportion of glass microfibres is less than 30% by mass related to the total content of inorganic fibres, or glass fibres. The microfibres forming the textile surface can also be present in mixtures with other fibres, preferably glass fibres. Moreover a layered structure of microfibres and glass fibres is also possible.

The mass per unit surface area of the mat of glass fibres is between 25 and 150 g/m², and preferably between 30 and 70 g/m², wherein these numbers relate to a planar structure with binder. Suitable glass fibres include in particular those that have been manufactured from A-glass, E-glass, S-glass, C-glass, T-glass or R-glass; particularly preferred are fibres of C-, E-, T-glass, and mineral fibres based on basalt.

The mats can be manufactured in accordance with any method of known art. In the case of glass mats this is preferably the dry- or wet-laying method.

The binder proportion of the mat of inorganic fibres, in particular of the glass mat, is between 5 and 30%, and preferably between 10 and 25%, wherein these numbers relate to the total mass of the mat with binder.

The inventively used mats of inorganic fibres, in particular the glass mats, can also include reinforcements. Reinforcements serve to improve the mechanical properties of the mats, in particular the longitudinal and transverse strengths. Possible reinforcements include longitudinal threads or lattice structures. Suitable reinforcement materials are glass threads or structures of high modulus materials; these are introduced onto or into the planar textile structure during manufacture.

The inventively used mats of inorganic fibres, in particular mats of glass fibres, have a permeability to air in the range between 1,000 and 3,000 l/cm$^2$·sec, measured in accordance with DIN-EN9237, if the mat has been strengthened in step (i) with a binder, and values between 1,200 and 4,000 l/cm$^2$·sec, if the mat has been strengthened in step (i) by means of a hydrodynamic method. Mats with higher air permeabilities have a tendency to fill during coating with a coating material, as a result of which the masses per unit area of the coated mats increase excessively. Mats with air permeabilities that are too low have a tendency to allow only insufficient impregnation values in a subsequent impregnation of the coated mat.

In addition to adaptation of the permeability to air, the permeability of the mat of inorganic fibres can also— alternatively or additionally—be optimised by means of hydrophobisation of the fibre surface. This is possible, for example, by the addition of a hydrophobisation agent to the binder. A suitable hydrophobisation agent is, for example, "Nuva 2155", which can be obtained from the Clariant company.

The mats used for purposes of coating have a minimum strength of 20 N/5 cm. The measurement is undertaken in accordance with EN29073, Part 3 on samples with a width of 5 cm wide and a clamping length of 200 mm. Here the numerical value of the preload force, specified in centinewtons, corresponds to the numerical value of the mass per unit surface area of the sample, specified in grams per square metre.

Binder

The inventive mats of inorganic fibres, in particular the glass mats, are preferably pre-strengthened and for this purpose preferably contain urea binder, melamine binder, acetate binder, acrylate binder, or mixtures of the above-cited binders. In a further preferred configuration the mat contains binder based on polyvinyl alcohols. Moreover binders that are free of formaldehyde are particularly preferred.

The proportion of binder in the mat of inorganic fibres, in particular the glass mat, is between 5 and 30%, and preferably between 10 and 25%, wherein these numbers relate to the total mass of the mat with binder, but without a coating.

The binder can in addition also have fillers, in particular inorganic fillers, and particularly preferably inorganic mineral fillers, wherein the proportion of these is between 5 and 30%, and preferably between 10 and 20%, wherein these numbers relate to the total mass of the mat with binder, but without a coating.

Coating

The inventive mats of inorganic fibres, in particular the glass mats, have a coating of at least one layer on one of their two surfaces. Furthermore the coating can also be designed to have more than one layer, i.e. two, three, or more than three, layers. One- and two-layer coatings, in particular one-layer coatings, are preferred.

The coating that is applied onto the surface of the mat contains defined particle sizes, and is especially suitable for the direct application of decorative layers by means of direct printing techniques. The coating is selected such that it does not penetrate and fill the mat completely, as a result of which a low mass per unit surface area of the coating, i.e. of the coated mat, is made possible, while having the mentioned permeability to air (in accordance with Gurley) in the range from 50 to 150 sec/300 ml, preferably from 5 to 50 sec/100 ml, more preferred from 10 to 30 sec/100 ml. The coating makes possible a very smooth surface, which, expressed in terms of Bekk values, lies in the range between 100 and 500 sec, and preferably between 150 and 400 sec. In addition the coating has a very low void density. As a result no printing voids ensue in the direct printing process. This particular surface quality, i.e. a combination of low roughness and low numbers of voids, is achieved in particular by the use of application methods not requiring the application of force.

The inventively coated mats have a permeability to air (Gurley) of between 50 and 150 sec/300 ml, preferably from 5 to 50 sec/100 ml, more preferred from 10 to 30 sec/100 ml, and a smoothness in accordance with Bekk of between 100 and 500 sec. For purposes of ensuring the desired printability of the coating and the use of the printed mats the maintenance of both ranges of values is of crucial significance. In addition to the roughness of the surface, which is important for the print quality, the permeability to air also plays an important role in the impregnation of the mats.

The requirements for an extremely smooth surface that can be directly printed on can only be satisfied with great difficulty on mats based on inorganic fibres, in particular glass fibre mats, using conventional coating methods. Either the surface is good, but the adhesion to the substrate is poor, or the adhesion to the substrate is good, but, as a result of the capillary effects of the substrate, defects occur, such as e.g. pinholes. The avoidance of the penetration of the coating material into the mat requires moreover suitable coating materials and a coating method that applies the coating material onto the mat surface not requiring the application of force, and thereby at the same time enables sufficient adhesion to the mat. The following coating that has been discovered enables such a coating onto the mats of inorganic fibres as cited.

The inventive coating comprises particles, whose size lies between 0.1 and 5 µm, i.e. the D50 value, or median value, and particularly preferably the D100 value, or median value, lies in the above-cited range. The particle size preferably lies between 0.5 and 2 µm. Particle sizes of less than 0.5 µm densify the surface such that a later introduction of binder is only possible with extreme dilution, which leads to technical problems in the process.

The coating can also comprise mixtures of various types and sizes of particles, wherein the respective D50/D100 values, i.e. median values, in each case, both alone and also taken together, lie in the above-defined range.

Suitable particles are inorganic particles or pigments, in particular white pigments. Here these preferably take the form of barium sulphate, calcium carbonate, calciumsulfoaluminate, kaolin, talcum, titanium dioxide, zinc oxide, diatomaceous earth, SiO$_2$, chalk, coating clay, calcined clay, colour pigments, silicates, or mixtures of the same. The inventive particles are selected from materials that fulfil the criteria for A2 or SBI B 51 D0 in the later fire test. The coating particularly preferably contains at least 5 by mass, and preferably at least 10% by mass, of titanium dioxide.

In addition the coating can also have functional materials in the form of particles. The functional materials in the form of particles that may, on occasion, be present, usually have the same particle size as the other particles. The functional materials preferably take the form of materials for purposes of increasing fire resistance (flame retardants), materials for purposes of dissipating electrostatic charges, materials for purposes of screening electromagnetic radiation, and organic or inorganic pigments, in particular colour pigments.

Flame retardants take the form of inorganic flame retardants, organophosphorus flame retardants, nitrogen-based flame retardants or intumescent flame retardants. Halogenated (brominated and chlorinated) flame retardants can also be used, but are less preferred as a result of their risk assessment. Examples of such halogenated flame retardants are polybrominated diphenyl ether, e.g. DecaBDE, tetrabrombisphenol A, and HBCD (hexabromocyclododecane).

Nitrogen-based flame retardants take the form of melamines and ureas.

The organophosphorus flame retardants typically take the form of aromatic and alkyl esters of phosphoric acid. TCEP (tris chloroethyl phosphate), TCPP (tris chloropropyl phosphate), TDCPP (tris(dichloroisopropyl) phosphate), triphenyl phosphate, trioctyl phosphate (tris(2-ethylhexyl) phosphate), are preferably used.

The inorganic flame retardants typically take the form of hydroxides, such as aluminium hydroxide and magnesium hydroxide, borates, such as zinc borate, ammonium compounds, such as ammonium sulphate, red phosphorus, and antimony oxides, such as antimony trioxide and antimony pentoxide, or vermiculite.

By the use of agents for purposes of increasing the electrical conductivity antistatic and electromagnetic screening effects can be achieved.

The antistatic agents commonly take the form of particles that are electrically conductive. Suitable materials are electrically conductive carbon materials such as carbon black, graphite and carbon nanotubes (C-nanotubes), or conductive plastics.

The materials for purposes of screening electromagnetic radiation commonly take the form of electrically conductive materials.

The coating can in addition also have binding agents, which after the drying process remain in the coating. These additional binding agents are preferably added in quantities of 1 to 50 parts by mass, and particularly preferably 5 to 25 parts by mass of binding agent, relative to 100 parts by mass of inorganic pigment. Amongst the additional binding agents so-called emulsion polymers based on PVC, polystyrene acetate, polyacrylate acetate, and polyvinyl acetate, also in each case in the form of copolymers, are preferred.

Furthermore the coating can also have one or a plurality of thickeners. These preferably take the form of synthetic polymers, in particular celluloses, preferably carboxymethylcellulose.

Furthermore the coating can also comprise additional fluorescent or phosphorescent colourants, in particular visual whiteners. Further components of the coating can also be flow aids, or other colourants.

The coating (total thickness of the coating) is between 50 and 1,000 μm, and preferably between 100 and 500 μm after drying.

Insofar as the aqueous dispersion that is used for purposes of coating in addition also has binding agents, the application can also take place in a two-layer form, or on occasion in a multi-layer form. Here a first layer is firstly applied onto the coating material and dried to the extent that it no longer automatically penetrates into the mat. Following on immediately, or also at a later point in time, a further aqueous dispersion can be applied and the required surface quality can be generated. In this form of embodiment the coating materials for the first and second layers of the coating can be the same or different.

The second, i.e. outer, layer of the coating preferably has a mass per unit surface area of between 10% and 40%, and preferably between 10% and 20%, of the total mass per unit surface area of the coating layers.

The coating material is applied in the form of an aqueous dispersion by means of an application process not requiring the application of force. Such processes ensure that the coating material cannot penetrate into the mat as a result of external mechanical forces. All methods of known art are suitable for this purpose, in particular, however, the transfer coating method and the slot bead method. In the transfer coating method the coating material is firstly applied onto a transfer medium, for example a tape, paper or film with release properties, and the mat of inorganic fibres is laid onto the transfer medium with the coating material and is pressed on with a light pressure, i.e. a pressure that is slightly above the ambient pressure, and in this manner the adhesion of the coating material to the surface of the mat is ensured. In the slot bead method the coating material is applied onto the mat without the application of force by means of a broad slot. Here the application takes place in a mass-controlled manner.

The inventive coatings, in particular the particles, only penetrate partially into the mat. By virtue of the particle sizes selected, together with the surface quality, a coating with too high a roughness can be prevented, and the formation of a so-called "orange peel" effect can be avoided.

The drying of the inventive coating is undertaken in the usual temperature ranges.

Printing

In step (iv) the printing is executed directly onto the surface coating, For this purpose ink is applied to the coated mats and a decorative pattern is generated. Suitable printing methods are, in particular, rotary printing, digital printing, screen printing, offset printing, etc.

In the context of the invention, "directly" signifies that the surfaces no longer need to be smoothed using abrasive methods, and there are no longer any unevennesses present that must be removed by the application of appropriate fillers.

In a further step in the production process the printed mats are then impregnated with a B-stage binder system.

Protective Layer

In step (v) the printed surface of the coating can optionally be provided with a protective layer. Here all transparent varnishes, or materials similar to varnish that are compatible with the coating, are suitable. Here UV-resistant and/or UV-protective varnishes, or layers similar to varnish, are particularly preferred.

B-Stage Binder System

In step (vi) the printed mat is furnished with a binder system capable of B-stage curing.

The inventively used binder system capable of B-stage curing comprises (i) at least one binder capable of B-stage curing, and, on occasion, at least one further, self-crosslinking, preferably thermally crosslinking, binder.

The quantity of binder system capable of B-stage curing applied in step (vi) is between 40 and 80% by mass, and preferably between 50 and 70% by mass, wherein these numbers relate to the total mass of the mat after the binder has been fully dried and crosslinked.

"Binders capable of B-stage curing" are understood to be binders that are only partially strengthened, i.e. cured, i.e. are present in the B-stage state, and can still experience a final strengthening, for example by means of later thermal treatment. Such B-stage binders are described in detail in U.S. Pat. Nos. 5,837,620, 6,303,207 and 6,331,339. The B-stage binders there disclosed are also the subject of the present description. B-stage binders preferably take the form of binders based on furfuryl alcohol formaldehyde resins, phenol formaldehyde resins, melamine formaldehyde resins, urea formaldehyde resins, and mixtures of these. They preferably take the form of aqueous systems. Other preferred binder systems are binders that are free of formaldehyde. B-stage binders are distinguished by the fact that they can be subjected to a multistage curing process, i.e. after the first curing, or the first curings, they still have a sufficient binding action (in the B-stage state) so as to be able to use this in the further processing. Usually such binders are cured in one step at temperatures of approximately 350° F. after the addition of a catalyst.

For purposes of forming the B-stage such binders are cured, if necessary after the addition of a catalyst. The curing catalyst proportion is up to 10% by mass, and preferably 0.1 to 5% by mass (related to the total binder content). Ammonium nitrate, and organic aromatic acids, e.g. maleic acid and p-toluene sulphonic acid, are, for example, suitable as the curing catalyst, since these allow the B-stage state to be achieved more quickly. In addition to ammonium nitrate, maleic acid and p-toluene sulphonic acid, all materials that have a comparable acidic function are suitable as curing catalysts. To achieve the B-stage the planar textile structure, impregnated with the binder, is dried under the influence of temperature, without generating a complete cure. The process parameters required are dependent on the binder system that is selected.

The lower temperature limit can be influenced by the choice of process duration, or by the addition of more or stronger acidic curing catalysts.

Particularly preferred are B-stage binders based on urea formaldehyde (UF), melamine formaldehyde (MF), epoxy, or mixtures of UF and MF binders.

Self-crosslinking binders are binders that react chemically completely, without the addition of a catalyst. The crosslinking is preferably thermally induced. In particular it has been shown that aqueous acrylate dispersions, polymer dispersions of vinyl acetate and ethyls, or similar crosslinking binders, in particular thermally crosslinking binders, are suitable. Particularly suitable are acrylate binders.

The proportion of the self-crosslinking binder in the binder system capable of B-stage curing is a maximum of 20% by mass, and preferably a maximum of 15% by mass, and particularly preferably a maximum of 10% by mass, wherein the values are with reference to the binder system capable of B-stage curing (B-stage binders and self-crosslinking binders), without taking into account the residual moisture content, i.e. after drying and complete crosslinking of the binder.

The proportion of the self-crosslinking binder in the binder system capable of B-stage curing is preferably at least 2% by mass, and preferably at least 5% by mass, wherein the values are with reference to the binder system capable of B-stage curing (B-stage binders and self-crosslinking binders), without taking into account the residual moisture content, i.e. after drying and complete crosslinking of the binder.

The application of the binder system capable of B-stage curing can take place with the aid of methods of known art. In addition to being sprayed on, impregnated, or pressed in, the binder can also be applied by means of a coating process, or by means of rotating nozzle heads. Furthermore a foam application is also possible. A single-sided binder application, i.e. the application of the binder only on the non-coated side of the mat, is also possible, and is in particular necessary in the case of coated mats in which the coating has been provided with an additional protective layer.

The drying process in step (vii) takes place at temperatures between 90° C. and a maximum of 200° C., wherein the dwell time in the dryer is typically between 30 and 60 seconds at the above-cited range of temperatures. The drying process in accordance with step (vii) causes the binder capable of B-stage curing to be at least partially cured, but not completely, and the additional, self-crosslinking binder to be completely cured.

The degree of curing of the B-stage binder is usually determined by measuring the condensation moisture content occurring when curing is complete.

The residual moisture content is determined as a relative alteration in the mass of a sample when subjected to a temperature of 170° C. for 2 minutes. Complete curing leads to residual moisture contents of less than 1%. Incompletely crosslinked binders, i.e. binders in the B-stage, result in residual moisture contents of between 1% and 5%, and preferably of between 1.5% and 4%, in inventively manufactured mats.

Alternatively it is possible to determine the degree of curing with the aid of the tensile strength of the mat. Complete curing of the binder system capable of B-stage curing is assumed to have occurred if the tensile strength is a minimum of 95% or more of the maximum possible tensile strength. The drying process in step (vii) causes the B-stage binder to be not yet completely crosslinked, and the mat to have a tensile strength of less than 20% of the maximum possible tensile strength (in accordance with DIN EN 29073T3).

Drying devices of known art are used for the drying process.

The material webs are then rolled up and/or cut to size.

Use

The inventively coated and printed mats of inorganic fibres, in particular the glass mats, are smooth, plane and light in mass. In particular, very good values in terms of flammability also ensue when compared with those for papers, i.e. the calorimetric values of such coated mat-form materials make many applications possible, for which other systems are not suitable.

The inventively coated mats of inorganic fibres, in particular the glass mats, have a binder system capable of B-stage curing that is still in the B-stage state (with residual moisture contents of between 1% and 5%, and preferably of between 1.5% and 4%) and can be laminated onto a substrate, or pressure can be applied to form a laminate, for purposes of further processing under pressure and temperature. Such composite materials are also the subject of the present invention. Alternatively the application of pressure can also be executed with two overlay papers or overlay mat-form materials, which have a further B-stage binder. Here the decorative mat-form material lies in the centre of the two overlay systems. Suitable presses are e.g. short-cycle presses, continuous presses, or similar methods of known art. Instead of the first overlay layer an acrylic topcoat or a PU topcoat can also be separately applied as an alternative. The use of short-cycle presses enables the use of engraved press plates, which in turn allows a 3-D structure to be formed on the substrate. The engraving can be configured such that it is synchronised with the decorative pattern.

Pressure can also be applied to the inventively coated and printed mats using the CPL/HPL method, if necessary with a backing paper on the rear side. The plastic laminate can then be adhesively bonded onto the material in a separate step. If necessary the HPL or CPL method can also include an overlay paper.

The inventively coated and printed mats of inorganic fibres, in particular the glass mats, can also be used for floor coverings, e.g. PVC, cushion vinyl, or similar.

The inventively coated and printed mats of inorganic fibres, in particular the glass mats, can be provided with a decorative pattern and used as a wallcovering, e.g. as wallpaper. Such decorative layers can conventionally be installed using paste on conventional walls. If necessary such decorative layers are also furnished in a "pre-glued" form, so as to enable simpler installation on the wall.

Using calendaring machines, hot presses or double belt presses the inventively coated and printed mats of inorganic fibres, in particular the glass mats, can be applied onto thermoplastic substrates such as PU, PVC, and PO.

Depending upon the final application still more additional protective layers can be applied. Alternatively other substrates such as glass wool sheets, cork sheets, gypsum sheets, etc., can also be decorated. For floor coverings anti-slip particles, e.g. of corundum, can also be introduced.

In contrast to papers the inventively used mats of inorganic fibres, in particular the glass mats, have a significantly higher dimensional stability.

By the use of an additional binder in the coating process the inventively coated and printed mats of inorganic fibres, in particular the glass mats, have a surprisingly good, that is to say excellent, drapability, and are not brittle in the same way as e.g. conventional glass mats. For this reason the inventively coated and printed mats of inorganic fibres, in particular the glass mats, are also suitable for elastic flooring applications such as e.g. cushion vinyl, or polyolefins, or polyurethane (PU), and also for decorative ceiling panels of wooden boards, engineered wood sheets, or mineral fibres, or plastic panels.

The invention claimed is:

1. A mat of inorganic fibres, which on one of the two surfaces has a printable coating, wherein:
   (i) the coating is applied directly to the one of the two surfaces of the mat, wherein the coating comprises particles, whose grain size lies in the range from 0.1 μm to 5 μm, and the mass per unit surface area of the coating corresponds to a mass per unit surface area of between 50 and 200 g/m$^2$,
   (ii) the coating has been applied onto the mat using transfer coating or slot bead coating,
   (iii) the printing has been applied directly onto the surface coating,
   characterised in that, the coated mat has a permeability to air (in accordance with Gurley) in the range from 5 to 50 sec/100 ml, and smoothness values (in accordance with Bekk) between 100 and 500 sec.

2. The mat according to claim 1, characterised in that, the mat has a binder capable of B-stage curing, which is cured at least partially—but not completely—and the binder capable of B-stage curing has a residual moisture content of between 1% and 5%.

3. A mat of inorganic fibres, which on one of the two surfaces has a printed coating, wherein:
   (i) the coating is applied directly to the one of the two surfaces of the mat, wherein the coating comprises particles, whose grain size lies in the range from 0.1 μm to 5 μm, and the mass per unit surface area of the coating corresponds to a mass per unit surface area of between 50 and 200 g/m$^2$,
   (ii) the coating has been applied onto the mat using transfer coating or slot bead coating,
   (iii) the printing has been applied directly onto the surface coating,
   (iv) the coated and printed mat has a binder system capable of B-stage curing in the B-stage state,
   (v) the quantity of the binder system capable of B-stage curing applied is between 40% and 80% by mass, wherein the quantity is based on a total mass of the mat after the mat has been fully dried.

4. The mat according to claim 3, characterised in that, the binder system has a residual moisture content of between 1% and 5%.

5. The mat according to claim 1, wherein:
the coating does not penetrate and fill the mat completely.

6. The mat according to claim 1, wherein:
the coating comprises one or more of barium sulphate, calcium carbonate, calcium sufoaluminate, kaolin, talcum, titanium oxide, zinc oxide, diatomaceous earth, silicon dioxide, chalk, coating clay, calcined clay, colour pigments, silicates, or mixtures thereof.

7. The mat according to claim 1, wherein:
the coating comprises at least 5% by mass titanium dioxide.

8. The mat according to claim 1, wherein:
the coating comprises an additional binding agent present in the amount of 1 to 50 parts by mass relative to 100 parts by mass of an inorganic pigment.

9. The mat according to claim 1, wherein:
the coating has a thickness of between about 50 and 1000 μm.

10. The mat according to claim 1, further comprising:
a protective layer applied on an exposed surface of the coating.

11. The mat according to claim 10, wherein:
the protective layer comprises one or both of an ultraviolet (UV)-resistant or a UV-protective material.

12. The mat according to claim 3, wherein:
the binder system capable of B-stage curing is applied to both the coating and the mat.

13. The mat according to claim 3, wherein:
the coating has a thickness of between about 100 and 500 μm.

14. The mat according to claim 3, wherein:
the particles have a grain size from 0.5 μm to 2 μm.

15. The mat according to claim 3, wherein:
the coating comprises one or more of a flame retardant, an antistatic agent, a flow aid, or an electrically conductive material.

16. The mat according to claim 3, wherein:
the coating penetrates at least partially into the mat.

17. The mat according to claim 3, wherein:
the coating comprises an additional binding agent present in the amount of 1 to 50 parts by mass relative to 100 parts by mass of an inorganic pigment.

18. The mat according to claim 3, wherein:
the coating comprises at least 10% by mass titanium dioxide.

19. The mat according to claim 3, further comprising:
a protective layer applied on an exposed surface of the coating.

20. A mat of inorganic fibres, which on one of the two surfaces has a printable coating, wherein:
the coating is applied directly to the one of the two surfaces of the mat, wherein the coating comprises particles, whose grain size lies in the range from 0.1 μm to 5 μm, and the mass per unit surface area of the coating corresponds to a mass per unit surface area of between 50 and 200 g/m$^2$;
the printing has been applied directly onto the surface coating; and the coated mat has a permeability to air (in accordance with Gurley) in the range from 5 to 50 sec/100 ml, and smoothness values (in accordance with Bekk) between 100 and 500 sec.

* * * * *